United States Patent [19]

Boter

[11] 4,004,943

[45] Jan. 25, 1977

[54] RECHARGEABLE ELECTROCHEMICAL CELL

[75] Inventor: Pieter Abraham Boter, Eindhoven, Netherlands

[73] Assignee: U.S. Philips Corporation, New York, N.Y.

[22] Filed: Aug. 20, 1975

[21] Appl. No.: 606,165

[30] Foreign Application Priority Data

Aug. 19, 1974 Netherlands .................. 7411045

[52] U.S. Cl. .............................. 429/59; 429/220; 429/221; 429/223
[51] Int. Cl.² ........................................ H01M 35/02
[58] Field of Search .............. 136/63, 20, 28, 29, 136/120 R, 120 FC, 137, 83 R, 86 D

[56] References Cited

UNITED STATES PATENTS 3,874,928   4/1975   Will .................................. 136/6 R

FOREIGN PATENTS OR APPLICATIONS 2,003,749   7/1970   Germany

*Primary Examiner*—Anthony Skapars
*Attorney, Agent, or Firm*—Frank R. Trifari; Norman N. Spain

[57] ABSTRACT

Rechargeable electrochemical cell an electrode of which consists of a lanthanum nickel compound while the counterelectrode consists of a material which is capable of reversibly taking up and giving off an electron and a proton, such as nickel hydroxide or manganese dioxide.

4 Claims, 1 Drawing Figure

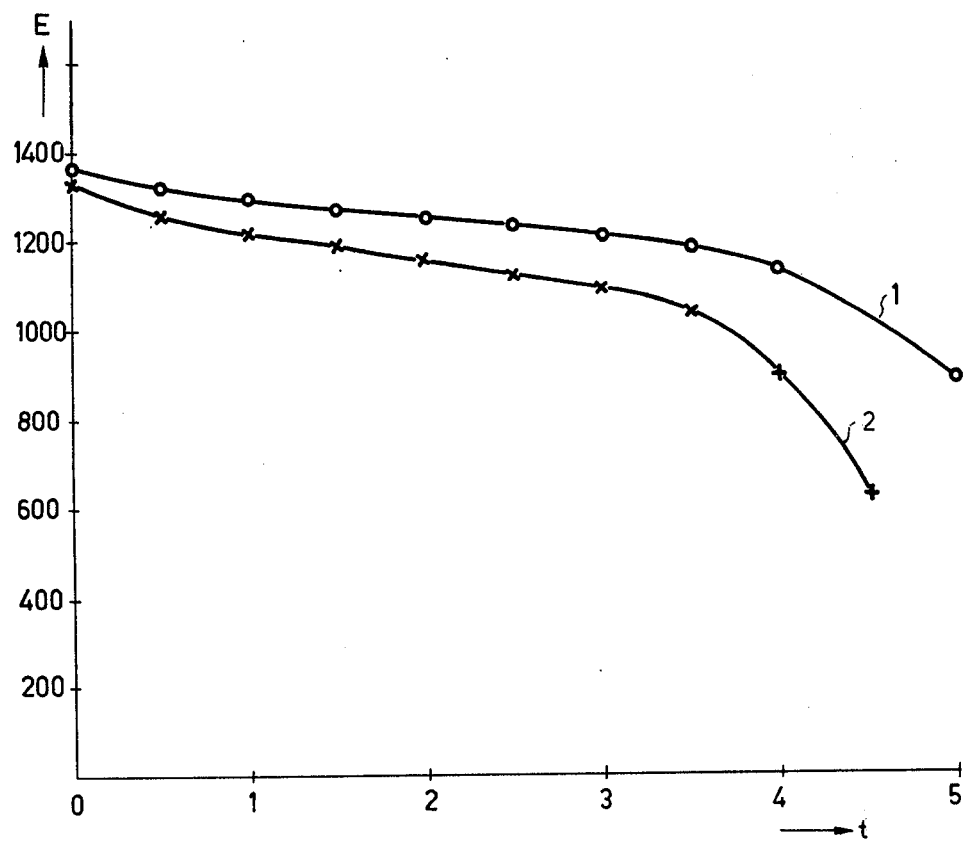

RECHARGEABLE ELECTROCHEMICAL CELL

The invention relates to a rechargeable electrochemical cell an electrode of which consists of $La_{1-y}R_yNi_{5-z}M_zH_x$, where $y = 0$ to 1, $z = 0$ to 1, $x = 0$ to 7, $R$ is a metal of the group comprising the rare earth metals, calcium and thorium, and $M$ is a metal of the group comprising cobalt, copper and iron, with the understanding that in the presence of iron $z \leq 0.2$.

An electrochemical cell using $LaNi_5$ as a hydrogen absorbing electrode is described in German Offenlegungsschrift 2,003,749. In this known cell the anode material is zinc, the electrolyte is a sodium chloride solution (10% by weight) and the cathode material is La $Ni_5$. This known cell is a primary cell which cannot be recharged. La $Ni_5$ is used as the cathode material because of its capability of binding hydrogen by the formation of La $Ni_5H_x$, where depending upon the hydrogen pressure $x = 0$ to 6. The hydrogen evolved at the cathode when the cell produces electric current is bound by the $LaNi_5$ cathode material with the formation of $LaNi_5H_x$, where $x$ has the aforementioned meaning. At a given temperature the value of $x$ depends upon the hydrogen pressure. At 20° C and a hydrogen pressure of 1 atmosphere, $x < 1$.

This known primary cell is not very suitable for practical use, inter alia because the e.m.f. is only about 500 mV.

It is an object of the present invention to provide a rechargeable electrochemical cell having an electrode of the aforementioned composition.

According to the invention this is obtained by an electrochemical cell having an electrode which consists of $La_{1-y}R_yNi_{5-z}M_zH_x$, where $y = 0$ to 1, $z = 0$ to 1, $x = 0$ to 1, $R$ is a metal of the group comprising the rare earth metals, calcium and thorium, and M is a metal of the group comprising cobalt, copper and iron, with the understanding that in the presence of iron $z \leq 0.2$, a counterelectrode and an electrolyte, which cell is characterized in that the counterelectrode is made of a material which is capable of reversibly taking up and giving off a proton and an electron. The electrolyte preferably is alkaline or mildly acid. Electrodes capable of reversibly taking up a proton and an electron consist, for example, of nickel hydroxide or manganese dioxide. The electrolyte may consist of an aqueous solution of KOH. When for intermetallic compounds, such as $LaNi_5$, the amount of hydrogen absorbed at a given temperature is plotted against the hydrogen pressure, it is found that with these compounds for each temperature the isothermal includes a substantially horizontal part. This substantially horizontal part indicates that with a small change of the hydrogen pressure much hydrogen is absorbed or given up by the intermetallic compound. This pressure is frequently referred to as the plateau pressure.

As the electrode material $La_{1-y}R_yNi_{5-z}M_zH_x$ for the electrochemical cell according to the invention preferably a material is used which at 20° C has a plateau pressure which is comparatively low and preferably less than one atmosphere. An example of such a material is $LaNi_4CuH_x$ which at 20° C has a plateau pressure of 0.7 to 0.8 atmosphere. This material is not mentioned in the above-cited German Offenlegungsschrift. This only mentions materials having a plateau pressure of 2.5 atmospheres and higher.

A rechargeable electrochemical cell according to the preferred embodiment of the invention has the advantage that during use high hydrogen pressures can be avoided, which simplifies the construction of the sealing-off.

An electrochemical cell according to the invention can be used as a rechargeable battery owing to the fact that an electrode consisting of $La_{1-y}R_yNi_{5-z}M_zH_x$ has proved to be a very good reversible electrode having fast reaction cinetics. Hence such an electrode is found to have also good load capability both when being charged and when being discharged.

This was found inter alia for an electrochemical cell according to the invention (size R14) an electrode of which consisted of $LaNi_4CuH_x$ (where depending on the charge condition $x$ can reach a value between 0 and 4.8). The charging current in a 5N solution of potassium hydroxide was 0.5 $C/h$ (C = capacity of the electrode in Ah). Starting from $LaNi_4CuH_x$, where $x = 0$, the theoretical amount of hydrogen was absorbed by the electrode in 2 hours. The counterelectrode was made on the basis of $Ni(OH)_2/NiOOH$ in an embodiment as is commonly used in alkaline Ni/Cd cells. E.m.f. of the cell: about 1,380 mV. When the charged cell is discharged the following reactions occur roughly at the electrodes:

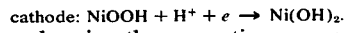

When charging these reactions are reversed.

It was found that a fully charged cell after being exposed to the air at room temperature had lost less than 10% of its charge in 340 hours.

The accompanying drawing shows the discharge curve 1 of the aforementioned electrochemical cell (vertical axis: E in mV; horizontal axis: $t$ in hours). Discharge current 480 mA; the size of the cell is R14.

For comparison the same Figure shows the discharge curve 2 of a commercially available nickel cadmium cell of the same size. Discharge current also 480 mV.

The Figure shows that whilst the cell according to the invention delivers a current which is comparatively large for the size R14 the cell voltage (curve 1) remains reasonably constant and that the number of watt-hours supplied is markedly greater than that of the nickel cadmium cell.

What is claimed is:
1. A rechargeable electrochemical cell having an electrode which consists of $La_{1-y}R_yNi_{5-z}M_zH_x$, where $y = 0$ to 1, $z = 0$ to 1, $x = 0$ to 7, $R$ is a metal selected from the group consisting of the rare earth metals, calcium and thorium, and M is a metal selected from the group consisting of cobalt, copper and iron, in the presence of iron $z < 0.2$, a counterelectrode consisting of a material which is capable of reversibly taking up and giving off a proton and an electron and an electrolyte.

2. The rechargeable electrochemical cell of claim 1, wherein an electrode made of $La_{1-y}R_yNi_{5-z}M_zH_x$ is used the plateau pressure of which at 20° C is not greater than, 1 atmosphere.

3. The rechargeable electrochemical cell of claim 2, wherein the electrode consists of $LaNi_4CuH_x$, where depending upon the charge condition $x$ lies between 0 and 4.8.

4. The rechargeable electrochemical cell of claim 1 having a counterelectrode made of a compound selected from the group consisting of nickel hydroxide and manganese dioxide.